(12) United States Patent
Chen et al.

(10) Patent No.: US 9,514,629 B2
(45) Date of Patent: Dec. 6, 2016

(54) VEHICLE DOOR OPENING WARNING SYSTEM AND VEHICLE DOOR OPENING WARNING METHOD

(71) Applicant: Unimicron Technology Corp., Taoyuan (TW)

(72) Inventors: Yin-Ju Chen, Chiayi County (TW); Cheng-Po Yu, Taoyuan (TW)

(73) Assignee: Unimicron Technology Corp., Taoyuan (TW)

( * ) Notice: Subject to any disclaimer, the term of this patent is extended or adjusted under 35 U.S.C. 154(b) by 0 days.

(21) Appl. No.: 14/680,075

(22) Filed: Apr. 7, 2015

(65) Prior Publication Data
US 2016/0300473 A1 Oct. 13, 2016

(51) Int. Cl.
*B60Q 1/26* (2006.01)
*G08B 21/24* (2006.01)
*B60Q 9/00* (2006.01)
*G08G 1/16* (2006.01)

(52) U.S. Cl.
CPC ............... *G08B 21/24* (2013.01); *B60Q 9/008* (2013.01); *G08G 1/166* (2013.01)

(58) Field of Classification Search
CPC .......... B60Q 1/26; B60Q 1/32; B60Q 1/323; B60Q 1/24; B60Q 2400/50
USPC .......... 340/435, 436, 438, 463, 468; 701/49, 701/70, 300, 301
See application file for complete search history.

(56) References Cited

U.S. PATENT DOCUMENTS

| | | | | |
|---|---|---|---|---|
| 8,620,549 B2 * | 12/2013 | Nickolaou | ............. | B60Q 9/008 340/457 |
| 8,963,701 B2 * | 2/2015 | Rodriguez Barros | ................ | B60Q 1/2665 340/438 |
| 9,308,860 B2 * | 4/2016 | Cha | .......................... | B60R 3/02 |
| 2003/0169160 A1 * | 9/2003 | Rodriguez Barros | ................ | B60Q 1/2665 340/426.1 |

FOREIGN PATENT DOCUMENTS

| | | | | |
|---|---|---|---|---|
| CN | 1996049 | 7/2007 | | |
| CN | 200951733 | 9/2007 | | |
| CN | 201732245 | * 2/2011 | ............ | B60Q 9/008 |
| CN | 101994429 | 3/2011 | | |
| CN | 202879398 | 4/2013 | | |
| CN | 202952900 | 5/2013 | | |
| CN | 203318338 | 12/2013 | | |

* cited by examiner

*Primary Examiner* — Hung T Nguyen
(74) *Attorney, Agent, or Firm* — Jianq Chyun IP Office

(57) ABSTRACT

A vehicle door opening warning system including a control unit, a projection unit and a detection unit is provided. The control unit is disposed at a door of a vehicle. The projection unit is disposed at the door and is electrically coupled to the control unit. The detection unit is disposed outside of the vehicle and is electrically coupled to the control unit. When the detection unit detects a moving object existing within 5 to 30 meters of the vehicle, the detection unit produces a signal. The control unit receives the signal and controls the projection unit to project a warning message according to the signal. A vehicle door opening warning method is also provided.

8 Claims, 4 Drawing Sheets

VEHICLE DOOR OPENING WARNING SYSTEM AND VEHICLE DOOR OPENING WARNING METHOD

BACKGROUND OF THE INVENTION

1. Field of the Invention

The invention generally relates to a warning system and a warning method, and more particularly, to a vehicle door opening warning system and a vehicle door opening warning method.

2. Description of Related Art

Traffic safety has always been the most important issue with road users; for instance, after a driver stops a vehicle at a roadside, if the driver or passenger, when getting out of the vehicle, is unable to detect an incoming vehicle or person from behind due to having limited sight or neglects to watch out for the incoming car or person from behind, then an impact with the incoming vehicle or person from behind would often occur at the moment of opening the door, and thereby result in casualties and vehicle damages.

SUMMARY OF THE INVENTION

The invention is directed to a vehicle door opening warning system and a vehicle door opening warning method, which are capable of enhancing the safety when opening the door.

The invention is directed to a vehicle door opening warning system including a control unit, a projection unit and a detection unit. The control unit is disposed at a door of the vehicle. The projection unit is disposed at the door and is electrically coupled to the control unit. The detection unit is disposed outside of the vehicle and is electrically coupled to the control unit. When the detection unit detects a moving object existing within 5 to 30 meters of the vehicle, the detection unit produces a signal. The control unit receives the signal and controls the projection unit to project a warning message according to the signal.

In one embodiment of the invention, the projection unit includes a steering element and a projection lens. The projection lens is rotatably disposed at the door through the steering element, so as to turn the projection lens towards a predetermined projection area for projecting the warning message onto the predetermined projection area.

In one embodiment of the invention, the predetermined projection area is located on a window of the door.

In one embodiment of the invention, the vehicle door opening warning system further includes an independent power supply unit, which is configured to provide power to the control unit, the projection unit and the detection unit when the vehicle is turned off.

In one embodiment of the invention, the vehicle door opening warning system further includes an alarm unit, which is disposed inside the vehicle and is electrically coupled to the control unit. The control unit is adapted to control the alarm unit to emit a warning sound according to the signal.

In one embodiment of the invention, when the detection unit detects that a distance between the moving object and the vehicle ranges between 5 to 30 meters and a moving speed of the moving object is greater than a preset speed, the control unit controls the projection unit to project the warning message according to the signal.

The invention is directed to a vehicle door opening warning method, the method includes: detecting whether a moving object is existed within 5 to 30 meters of a vehicle by using a detection unit disposed outside of the vehicle, and the moving object is existed within 5 to 30 meters of the vehicle, the detection unit sends a signal to a control unit disposed at a door of the vehicle, so as to enable the control unit to control a projection unit disposed at the door to project a warning message according to the signal.

In one embodiment of the invention, the step of detecting whether the moving object is existed within 5 to 30 meters of the vehicle by using the detection unit includes: detecting a distance between the moving object and the vehicle and a moving speed of the moving object, and determining whether the distance ranges between 5 to 30 meters and whether the moving speed is greater than a preset speed; and when the distance ranges between 5 to 30 meters and the moving speed is greater than the preset speed, determining the moving object is existed within 5 to 30 meters of the vehicle.

In one embodiment of the invention, when the moving object does not exist within 5 to 30 meters of the vehicle, the detection unit sends another signal to the control unit, so as to enable the control unit controls the projection unit to project a safe message according to the another signal.

In view of the above, after the vehicle is stopped at a roadside, the vehicle door warning system of the invention may detects whether there is an incoming vehicle or person (namely, the moving object) from behind the vehicle by using the detection unit. The detection unit produces a signal when detecting that the moving objects is existed within 5 to 30 meters of the vehicle, wherein the control unit receives the signal and controls the projection unit to project a warning message according to the signal. As such, when a driver or passenger intends to open the door, the driver or passenger can determine whether to open the door immediately based on whether the warning message has been seen, so as to enhance the safety when opening the door, and thus prevent casualties and vehicle damages from being caused due to having an impact with the incoming vehicle or person at the moment of opening the door.

In order to make the aforementioned features and advantages of the present invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
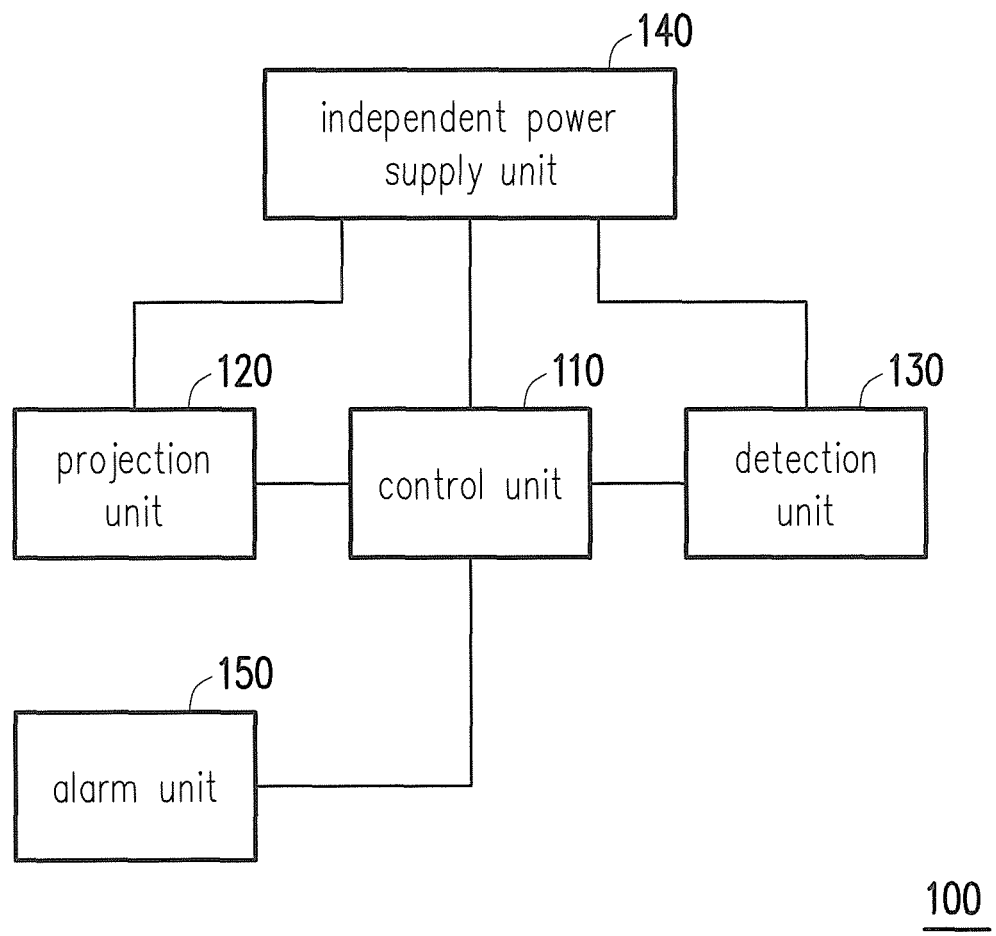
FIG. 1 illustrates a vehicle door opening warning system according to an embodiment of the invention.
Figure 2:
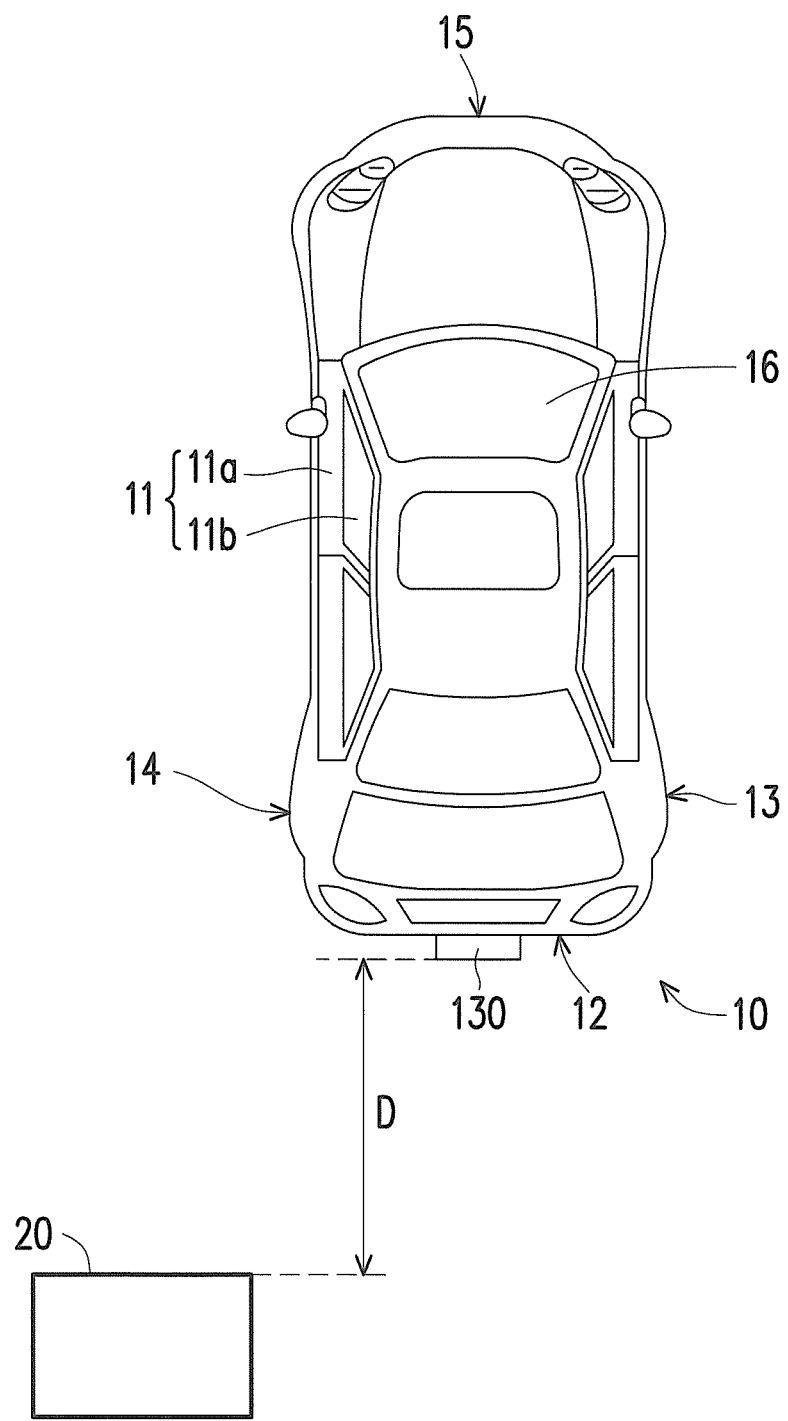
FIG. 2 illustrates a vehicle being applied with the vehicle door opening warning system of FIG. 1.
Figure 3:
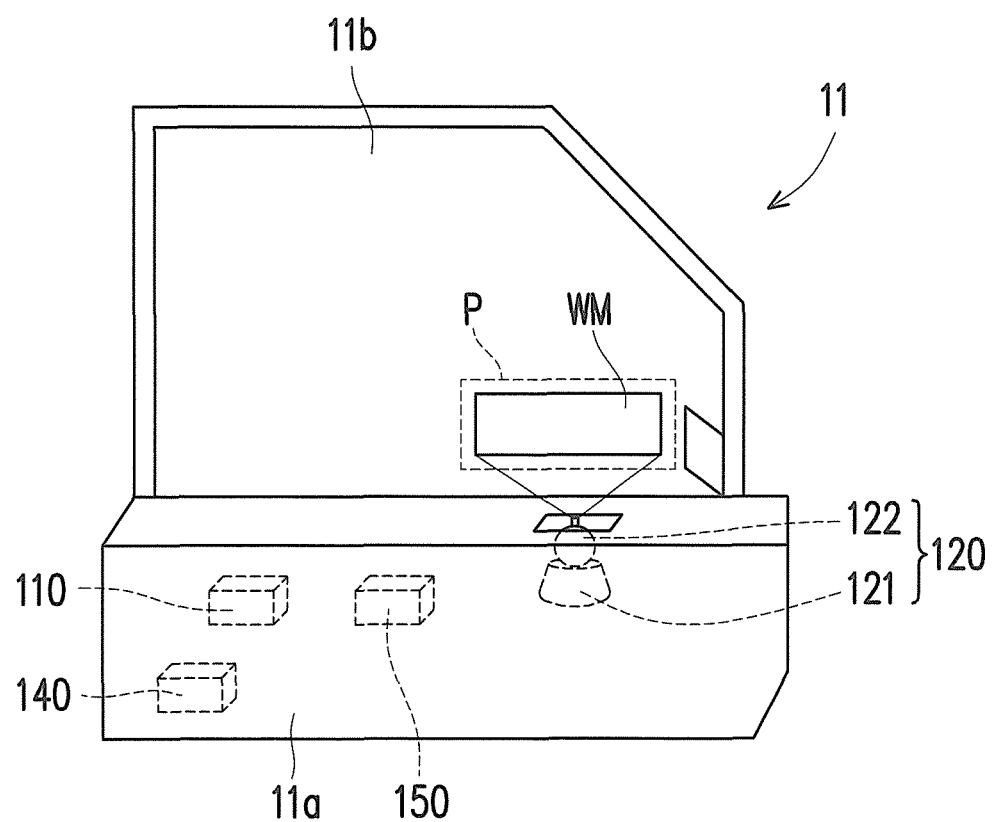
FIG. 3 is a schematic diagram illustrating the vehicle door of FIG. 2.

FIG. 1 illustrates a vehicle door opening warning system according to an embodiment of the invention. FIG. 2 illustrates a vehicle being applied with the vehicle door opening warning system of FIG. 1. FIG. 3 is a schematic diagram illustrating the vehicle door of FIG. 2. Referring to FIG. 1 through FIG. 3, in the present embodiment, a vehicle door opening warning system 100 is adapted to be used in a vehicle 10, and the vehicle door opening warning system 100 includes a control unit 110, a projection unit 120 and a detection unit 130.

The control unit 110 is, for example, disposed at a door 11 of the vehicle 10, and is electrically coupled to the projection unit 120 and the detection unit 130 respectively, so as to perform signal communication. The projection unit 120 is disposed at the door 11, and is located inside of the vehicle 10. As shown in FIG. 3, the projection unit 120 may include a steering element 121 and a projection lens 122, wherein the steering element 121 is, for example, embedded within a main body 11a of the door 11, the projection lens 122 is rotatably disposed at the main body 11a of the door 11 through the steering element 121, and a portion of the projection lens 122 protrudes out of the main body 11a so as to project an image, figure or text towards a proper position inside the vehicle 10. The detection unit 130 is, for example, an infrared sensor, a laser sensor or other suitable types of distance sensor, and is disposed outside of the vehicle 10, such as located at a rear side 12 of the vehicle 10, but the invention is not limited thereto. In other embodiments, the detection unit 130 may also be disposed at other side 13, 14 or 15 of the vehicle 10.

When the detection unit 130 detects a moving object 20 existing within 5 to 30 meters of the vehicle, the detection unit 130 produces a signal. Then, the control unit 110 receives the signal and controls the projection unit 120 to project a warning message WM according to the signal. In detail, a projecting direction of the projection lens 122 may be appropriately adjusted through the steering element 121 and by means of automatic, semi-automatic or manual approach; and therefore, the projection lens 122 may be turned towards a predetermined projection area P to project the warning message WM onto the predetermined projection area P. It is to be explained that, the predetermined projection area P must be determined according to a habit of a driver or passenger when opening the door 11; and since the driver or passenger usually would habitually gaze at a window 11b of the door 11 when opening the door 11, the predetermined projection area P is, for example, located on the window 11b of the door 11, wherein a region or position at where the predetermined projection area P locates on the window 11b may be adjusted according to the habit of the driver or passenger, and is not limited to the Example shown in FIG. 3. In other embodiments, the predetermined projection area P may also be located on a windshield 16 of the vehicle 10 or located at a backside of a seat (not shown) inside the vehicle 10, but the invention is not limited thereto.

On the other hand, a mechanism for the detection unit 130 in determining whether the moving object 20 is existed within 5 to 30 meters of the vehicle 10 is: when the detection unit 130 detects that a distance D between the moving object 20 and the vehicle 10 is ranged between 5 meters to 30 meters and a moving speed of the moving object 20 is greater than a preset speed (e.g., 20 kilometers/hour to 40 kilometers/hour), then it is determined that the moving object 20 is existed within 5 to 30 meters of the vehicle 10. At this movement, the detection unit 130 sends the signal to the control unit 110, so as to enable the control unit 110 to control the projection unit 120 to project the warning message WM according to the signal. As such, when the driver or passenger intends to open the door 11, the driver or passenger can determine whether to open the door 11 immediately based on whether the warning message WN projected onto the predetermined projection area P has been seen, so as to enhance the safety when opening the door 11, and thus prevent casualties and vehicle damages from being caused due to having an impact with the incoming vehicle or person at the moment of opening the door 11. In another embodiment, when the detection unit 130 determines that the moving object 20 does not exist within 5 to 30 meters of the vehicle 10, another signal may be send to the control unit 110, so that the control unit 110 may control the projection unit 120 to project a safe message (not shown) according to the another signal; and thus, when the driver or passenger intends to open the door 11, the driver or passenger can see that the safe message (not shown) is being projected onto the predetermined projection area P and then open the door 11 immediately.

In the present embodiment, the vehicle door opening warning system 100 further includes an independent power supply unit 140, which is, for example, disposed at the main body 11a of the door 11, and is configured to provide power to the control unit 110, the projection unit 120 and the detection unit 130 when the vehicle 10 is turned off, so that the control unit 110, the projection unit 120 and the detection unit 130 can continue to operate. On the other hand, the vehicle door opening warning system 100 further includes an alarm unit 150 disposed inside the vehicle 10 and is electrically coupled to the control unit 110, wherein the alarm unit 150 is, for example, disposed at the main body 11a of the door 11, but the invention is not limited thereto. Hence, the vehicle door opening warning system 100 of the present embodiment, not only can warn the driver or passenger through using the projection unit 120 to project the warning message, may also warn the driver or passenger through using the control unit 110 to control the alarm unit 150 to emit a warning sound (e.g., producing a warning voice or playing the warning sound) according to the signal, thereby enhancing the safety when opening the door 11.

Figure 4:
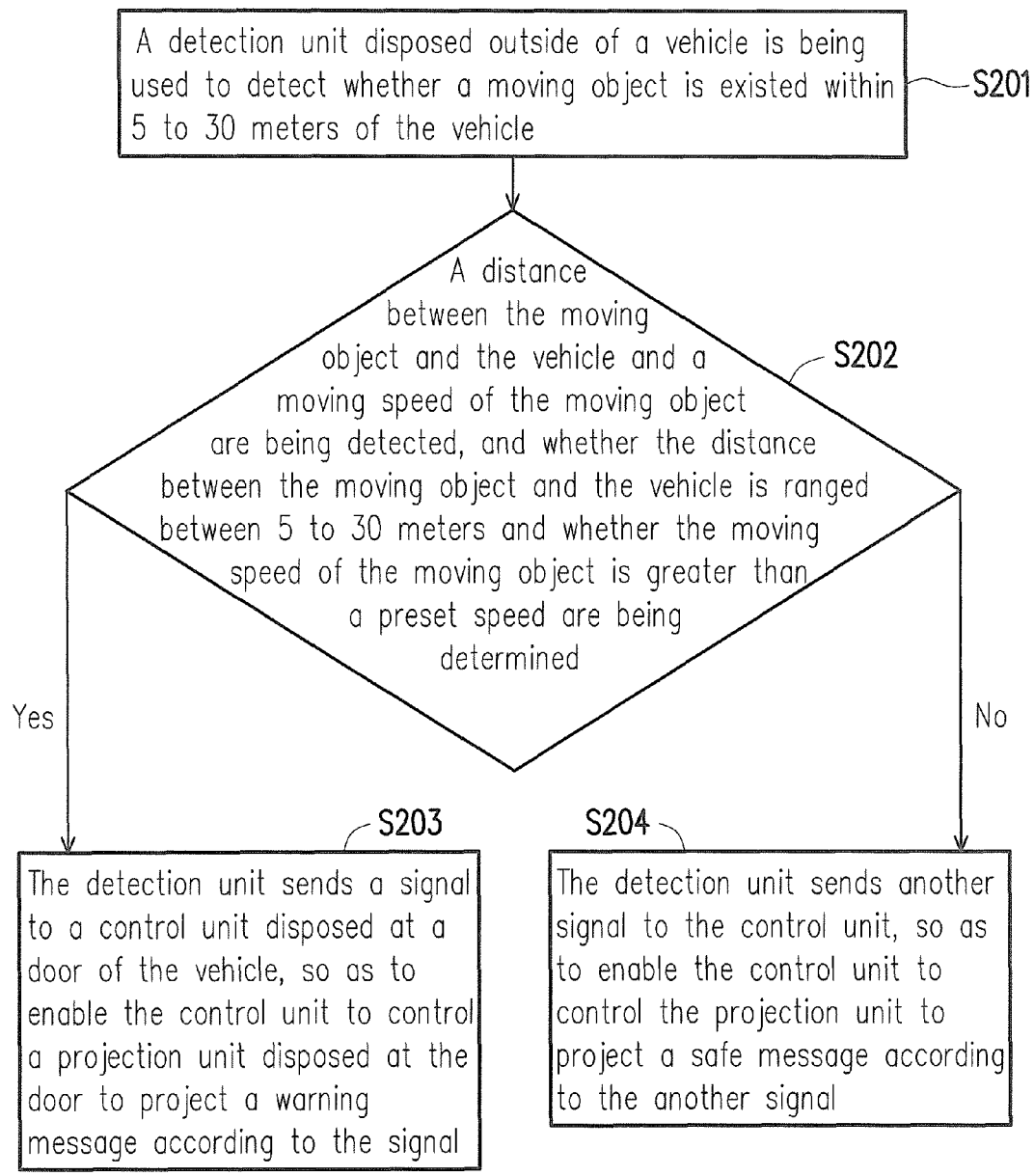
FIG. 4 is flow chart illustrating a vehicle door opening warning method according to an embodiment of the invention.

FIG. 4 is flow chart illustrating a vehicle door opening warning method according to an embodiment of the invention. Referring to FIG. 2 through FIG. 4, in step S201, a detection unit 130 disposed outside of a vehicle 10 is being used to detect whether a moving object 20 is existed within 5 to 30 meters of the vehicle 10. In step S202, the detection unit 130 simultaneously detects a distance D between the moving object 20 and the vehicle 10 and a moving speed of the moving object 20, and determines whether the distance D between the moving object 20 and the vehicle 10 is ranged between 5 to 30 meters and whether the moving speed of the moving object 20 is greater than a preset speed (e.g., 20 kilometers/hour to 40 kilometers/hour). When the distance D is ranged between 5 to 30 meters and the moving speed is greater than the preset speed (e.g., 20 kilometers/hour to 40 kilometers/hour), then it is determined that the moving object 20 is existed within 5 to 30 meters of the vehicle 10; and thus, in step S203, the detection unit 130 sends a signal to a control unit disposed at a door 10 of the vehicle 10, so as to enable the control unit 110 to control a projection unit 120 disposed at the door 10 to project a warning message WM according to the signal. Contrarily, when the distance D does not fall within 5 to 30 meters and the moving speed is smaller than the preset speed (e.g., 20 kilometers/hour to 40 kilometers/hour), then it is determined that the moving object 20 does not exist within 5 to 30 meters of the vehicle 10. Otherwise, if the detection unit 130 does not detect the moving object 20, then it is determined that the moving object 20 does not exist within 5 to 30 meters of the vehicle 10. Therefore, in step S204, the detection unit 130 sends another signal to the control unit 110, so as to enable the control unit 110 to control the projection unit 120 to project a safe message according to the another signal, so that the driver or passenger may know that there is not incoming car or person around the vehicle and thereby it is okay to open the door 11.

In summary, after the vehicle is stopped at a roadside, the vehicle door warning system of the invention may detects whether there is an incoming vehicle or person (namely, the moving object) from behind the vehicle by using the detection unit. The detection unit produces a signal when detecting that the moving objects is existed within 5 to 30 meters of the vehicle, wherein the control unit receives the signal and controls the projection unit to project a warning message according to the signal. As such, when the driver or passenger intends to open the door, the driver or passenger can determine whether to open the door immediately based on whether the warning message has been seen, so as to enhance the safety when opening the door, and thus prevent casualties and vehicle damages from being caused due to having an impact with the incoming vehicle or person at the moment of opening the door.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A vehicle door opening warning system, comprising:
   a control unit, disposed at a door of a vehicle;
   a projection unit, disposed at the door and electrically coupled to the control unit; and
   a detection unit, disposed outside of the vehicle, electrically coupled to the control unit, and producing a signal when the detection unit detects a moving object existing within 5 to 30 meters of the vehicle, wherein the control unit receives the signal and controls the projection unit to project a warning message according to the signal, wherein the projection unit comprises:
      a steering element; and
      a projection lens, rotatably disposed at the door through the steering element, to turn the projection lens towards a predetermined projection area for projecting the warning message onto the predetermined projection area.

2. The vehicle door opening warning system as recited in claim 1, wherein the predetermined projection area is located on a window of the door.

3. The vehicle door opening warning system as recited in claim 1, further comprising:
   an independent power supply unit, configured to provide power to the control unit, the projection unit and the detection unit when the vehicle is turned off.

4. The vehicle door opening warning system as recited in claim 1, further comprising:
   an alarm unit, disposed inside the vehicle and electrically coupled to the control unit, the control unit being adapted to control the alarm unit to emit a warning sound according to the signal.

5. The vehicle door opening warning system as recited in claim 1, wherein when the detection unit detects that a distance between the moving object and the vehicle ranges between 5 to 30 meters and a moving speed of the moving object is greater than a preset speed, the control unit controls the projection unit to project the warning message according to the signal.

6. A vehicle door opening warning method, comprising:
   detecting whether a moving object is existed within 5 to 30 meters of a vehicle by using a detection unit disposed outside of the vehicle; and
   when the moving object is existed within 5 to 30 meters of the vehicle, the detection unit sends a signal to a control unit disposed at a door of the vehicle, control unit controls a projection unit disposed at the door to project a warning message according to the signal, wherein the projection unit comprises a steering element and a projection lens rotatably disposed at the door through the steering element, to turn the projection lens towards a predetermined projection area for projecting the warning message onto the predetermined projection area.

7. The vehicle door opening warning method as recited in claim 6, wherein a step of detecting whether the moving object is existed within 5 to 30 meters of the vehicle by using the detection unit comprises:
   detecting a distance between the moving object and the vehicle and a moving speed of the moving object, and determining whether the distance ranges between 5 to 30 meters and whether the moving speed is greater than a preset speed; and
   when the distance ranges between 5 to 30 meters and the moving speed is greater than the preset speed, determining the moving object is existed within 5 to 30 meters of the vehicle.

8. The vehicle door opening warning method as recited in claim 6, wherein when the moving object does not exist within 5 to 30 meters of the vehicle, the detection unit sends another signal to the control unit, the control unit controls the projection unit to project a safe message according to the another signal.

* * * * *